A. M. BROWN.
ANIMAL TRAP.
APPLICATION FILED JUNE 5, 1919.
1,326,641.
Patented Dec. 30, 1919.
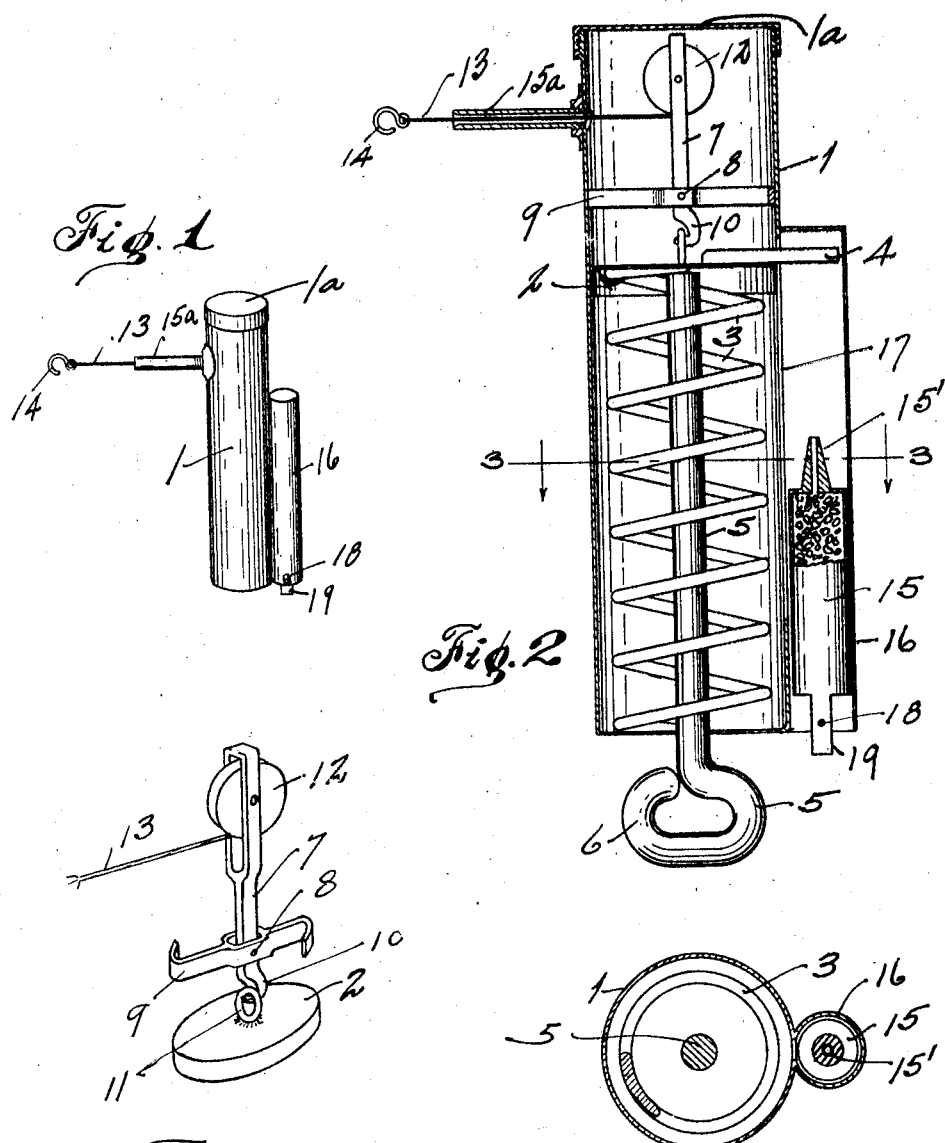
Inventor
Albert M. Brown
By Herbert E. Smith
Attorney

UNITED STATES PATENT OFFICE.

ALBERT M. BROWN, OF SPOKANE, WASHINGTON.

ANIMAL-TRAP.

1,326,641.	Specification of Letters Patent.	Patented Dec. 30, 1919.

Application filed June 5, 1919. Serial No. 301,902.

*To all whom it may concern:*

Be it known that I, ALBERT M. BROWN, a citizen of the United States, residing at Spokane, in the county of Spokane and State of Washington, have invented certain new and useful Improvements in Animal-Traps, of which the following is a specification.

The present invention relates to an improved animal trap embodying as its essential parts a bait and an explosive device to be incased therein, whereby, when the animal picks up the bait and its incased device and starts away with the bait and device, an anchoring string or cord firmly attached to a stationary part and also to the explosive device, will cause a detonation or explosion that will result in instant death to the animal, thus eliminating prolonged suffering or mutilation of the body of the animal.

The invention consists in certain novel combinations and arrangements of parts as will be hereinafter described and claimed. In the accompanying drawings one complete example of the physical embodiment of the invention is illustrated, the parts being combined and arranged according to the best mode so far devised for the practical application of the principles of the invention.

Figure 1 is a perspective view of the device complete, ready for anchoring or attachment by its pull cord or lanyard, to a stationary object, as a tree stump.

Fig. 2 is an enlarged, vertical central sectional view of the device in " set " or " cocked " position, the percussion cap however, being omitted from this view.

Fig. 3 is a transverse view at line 3—3 of Fig. 2.

Fig. 4 is a perspective view of the release device for the firing mechanism.

In the preferred form of the invention as illustrated in the drawings the device is of a size adapted to be incased within a piece of meat as a bait so that the animal, such as coyotes, wolves, bears and the like will seize the bait in its mouth and by pulling away from the anchorage of the bait, will explode the charge, causing a rupture of the brain, spinal cord, or nerve centers, with consequent instant death.

A cylindrical box or housing 1 with a piston head 2 is employed, the head being connected to the contractile spring 3 at one end thereof and the other end of the spring being secured to an end of the cylindrical housing as shown. The piston head carries a detonating device or firing pin 4 in the form of a metal rod or bar, fixed to the head and projecting therefrom, and the head may be pushed to " set " position against the tension of the spring 3 by the push bar or setting bar 5 that is attached to the piston head, extends through the spring, and has a handle 6 outside the cylinder to be used in manipulating the piston head when setting the trap.

The firing device including the spring pressed head and its firing pin, is held in set position, and released, by means of a latch lever 7 pivoted at 8 in a slotted bracket 9 that is fixed in one end of the housing, and the latch has a hooked end 10 to engage in a ring 11 on the piston head 4 to hold the device set against the tendency of the spring to contract, and of course the spring cannot move the piston head until the head is released.

At the free end of the latch lever 7 a slotted formation is provided and a winding reel 12 is journaled therein adapted to contain the cord 13 which has an attaching ring 14 or hook for attachment or anchorage to a stationary object, and preferably a guide sleeve 15ª is projected from the housing for the cord. This sleeve may be screwed into the housing as shown, and serves to retain the device in the meat bait as well as prevent the cord freezing to the meat during cold weather. In placing the bait it is located close to its anchorage, with the cord wound on the reel, and the device is designed so that the animal, as is customary, may start away with the bait with the result that the fixed cord will unwind from the reel before the lever latch is operated. When the cord is unwound, but with its end attached to the reel, further pull swings the lever latch on its pivot 8 and the hook 10 is withdrawn from the ring 11 and the piston head with its firing pin is released. The contractile spring pulls, with a sudden and quick movement, the firing pin which strikes a percussion cap (not shown) on the explosive cartridge 15 and the consequent explosion kills the animal as set forth. The cartridge is retained within a smaller housing or barrel 16 adjoining the large housing, with a slot 17 in their parting wall, through which the firing pin travels and is guided, and the cartridge is held in the open end of the barrel by a pin 18 passing through perforations in the barrel and through perforated lugs 19 projecting from the cartridge for the purpose.

The fulminate cartridge 15 is provided with the pointed end 15' to receive the percussion cap and the pointed end is provided with a passageway for the fire from the cap to ignite the charge in the cartridge. With the explosion, the entire device is wrecked or destroyed and cannot be again used, but the cost of the devices is comparatively small, and is compensated for by the time saved in setting the trap, the convenience in carrying or transporting the traps to their destinations, and the comparative value of the hide of the animal. Because of their comparatively small weight and compass, the trapper is enabled to carry numerous traps with him, and set hundreds of traps in a day without undue exertion, instead of packing a horse with loads of traps that must be set in groups about the bait in usual way.

The bait or chunk of meat is cut to receive the housing and the trap is set by pushing in on the stem or shank 5 (through handle 6) to extend the spring, and access may be had to the interior of the housing through cap 1ª to latch the lever to the ring 11 to hold the trap in "set" position, and the cord is anchored as described and preferably hidden beneath the bait which is left lying on the ground. A positive and direct blow is struck on the percussion cap by the firing pin when the spring and attached piston is released, and the movement of the piston is guided by its stem or shank 5 passing through the closed end of the cylindrical housing as well as by the movement of the pin through the slot 17 in the parting wall between the housing and barrel.

What I claim is—

1. The combination in an animal trap adapted for incasing within a bait and having a spring actuated device for firing an explosive charge inclosed within the bait, of a pivoted latch lever for holding the device inoperative, a reel on the free end of the latch lever, and an anchored cord wound about the reel for the purpose described.

2. The combination in an animal trap adapted for incasing within a bait and comprising a contractile spring actuated piston head and a cylinder therefor and a firing pin on said head, a pivoted latch lever for holding the piston head in set position, a reel on the free end of the lever, an anchored cord wound about the reel, and a container attached to the cylinder containing an explosive charge adapted to be fired by the action of the firing pin.

In testimony whereof I affix my signature.

ALBERT M. BROWN.